(12) United States Patent
Van Buren

(10) Patent No.: US 7,729,656 B2
(45) Date of Patent: Jun. 1, 2010

(54) CELLULAR NETWORK LOW NOISE AMPLIFIERS FOR USE WITH MULTIPLE FREQUENCIES

(75) Inventor: V. Alan Van Buren, Cedar City, UT (US)

(73) Assignee: Wilson Electronics, St. George, UT (US)

( * ) Notice: Subject to any disclaimer, the term of this patent is extended or adjusted under 35 U.S.C. 154(b) by 710 days.

(21) Appl. No.: 11/619,442

(22) Filed: Jan. 3, 2007

(65) Prior Publication Data

US 2008/0159187 A1  Jul. 3, 2008

(51) Int. Cl.
*H04B 3/36* (2006.01)
(52) U.S. Cl. .......................................... 455/7; 370/315
(58) Field of Classification Search ............... 455/7–10, 455/14–25; 370/315
See application file for complete search history.

(56) References Cited

U.S. PATENT DOCUMENTS 5,170,500 A * 12/1992 Broderick ................... 455/315
6,032,020 A * 2/2000 Cook et al. ..................... 455/7
6,795,714 B1 * 9/2004 Fickenscher et al. ...... 455/552.1
6,892,056 B1 * 5/2005 Garmonov et al. ............. 455/75
2002/0098809 A1 * 7/2002 Higuchi ....................... 455/84
2005/0287966 A1 * 12/2005 Yoshimi et al. ........... 455/127.1

* cited by examiner

*Primary Examiner*—Raymond S Dean
(74) *Attorney, Agent, or Firm*—Workman Nydegger

(57) ABSTRACT

An amplification circuit that enables a network amplifier to amplify multiple mobile telephone signals transmitted at different frequencies. The amplification circuit includes a first diplexer which receives a first signal having a first frequency band and a second signal having a second frequency band. The first diplexer generates a combined signal containing both the first and the second signals. The combined signal is amplified by a single low noise amplifier to generate an amplified combined signal. A second diplexer receives the amplified combined signal and separates the amplified combined signal into a first amplified signal having the first frequency band and a second amplified signal having the second frequency band. The resultant signals can then be transmitted by the network amplifier to a target destination, such as a handset or base station.

12 Claims, 3 Drawing Sheets

CELLULAR NETWORK LOW NOISE AMPLIFIERS FOR USE WITH MULTIPLE FREQUENCIES

BACKGROUND

1. The Field of the Invention

The present invention relates generally to wireless network amplifiers. More specifically, embodiments of the present invention relate to the use of a single amplifier for amplifying multiple wireless signals transmitted in different frequency bands.

2. The Relevant Technology

In recent years, cellular ("cell" or "mobile") telephones have dramatically increased in popularity. A growing number of people are relying exclusively on cell phones, and are abandoning their traditional land line telephone services in favor of the convenience of cell phones. This increase in cell phone reliance places increased demand on network providers to provide reliable cellular signal coverage over a wider area.

Use of cell phones in areas having a weak signal often results in dropped calls which can be annoying for the cell phone user and expensive for the wireless service provider. Dropped calls often occur when the signal between the cell phone and the base station is lost. A loss of signal may occur for a number of reasons, including interference due to buildings or mountains, or an increase in distance between the cell phone and the base station. Therefore, a need exists to increase the reliability of cell phones near large buildings and in vehicles driving long distances in remote areas. There is a need to ensure that reliable signal coverage is provided in a wireless network. Eliminating dropped calls or increasing coverage is beneficial to the network provider.

Attempts have been made to increase the reliability of cell phones through use of cell phone signal boosters, also known as cellular network amplifiers. Cellular network amplifiers receive the cellular signal sent from a base station, amplify the signal, and retransmit the signal to one or more cell phones. Similarly, the cellular network amplifier receives the signals from one or more cell phones, amplifies the signals, and retransmits the signals to the base station.

Cellular network amplifiers are typically placed in relatively close proximity to cell phones, and serve the purpose of increasing the level of the signals being transmitted to and from the cell phones so that the cell phones can communicate with base stations that would otherwise be out of range. Some amplifiers are configured to be integrated with the cell phone itself or with a cell phone cradle. Alternatively, other amplifiers are configured to be placed in a separate location from the cell phone itself. For example, a cellular network amplifier may be placed in a user's vehicle, or in or near a building that otherwise may have poor reception.

Because different handsets may transmit signals in different frequency bands, it is often necessary to provide an amplification system capable of amplifying mobile telephone signals transmitted at different frequencies. For example, two common frequencies at which the handset may transmit include the cellular spectrum (i.e., 800-900 MHz) and the PCS spectrum (i.e., 1850-1990 MHz). One shortcoming common to many cellular network amplifiers is that they are often configured to amplify signals transmitted within a single frequency band. Therefore, mobile telephone signals being transmitted outside of the frequency band of the cellular network amplifier will not be amplified.

One technique for amplifying mobile telephone signals having multiple frequency bands includes using separate network amplifiers for each band. Another technique for amplifying mobile telephone signals having multiple frequency bands includes using a single network amplifier having multiple amplifier circuits, where each amplifier circuit is used to amplify a separate frequency band. Typically, a separate Monolithic Microwave Integrated Circuit (MMIC) amplifier is used to amplify each of the different frequencies. The use of separate amplifier circuits for each frequency band will usually result in higher manufacturing costs in addition to increased weight and size. Furthermore, the use of separate MMIC amplifiers often results in undesirably high noise levels.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to a power amplification circuit for use within a network amplifier designed for amplifying mobile telephone signals transmitted at two or more different frequencies. The power amplification circuit includes a first diplexer configured to receive a first signal having a first frequency band and a second signal having a second frequency band. The first diplexer generates a combined signal containing both the first and the second signals. The combined signal is amplified by a single low noise amplifier to generate an amplified combined signal. A second diplexer receives the amplified combined signal and separates the amplified combined signal into a first amplified signal having the first frequency band and a second amplified signal having the second frequency band.

Another embodiment described in more detail herein includes a network amplifier for controlling a power amplifier for amplifying mobile telephone signals transmitted at two or more different frequencies. The network amplifier includes a first antenna for receiving downlink signals containing at least a first frequency band and a second frequency band. A first diplexer receives the downlink signals from the first antenna and generates a combined downlink signal containing each downlink signal received by the first antenna. The combined downlink signal is amplified by an amplifier, and is then separated by a second diplexer into a first amplified downlink signal having the first frequency band and a second amplified downlink signal having the second frequency band. The resultant signals are transmitted by a second antenna to target handsets. As will be appreciated by one of ordinary skill in the art, the present embodiment, may include peripheral devices in addition to those explicitly described above, such as duplexers and additional diplexers.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
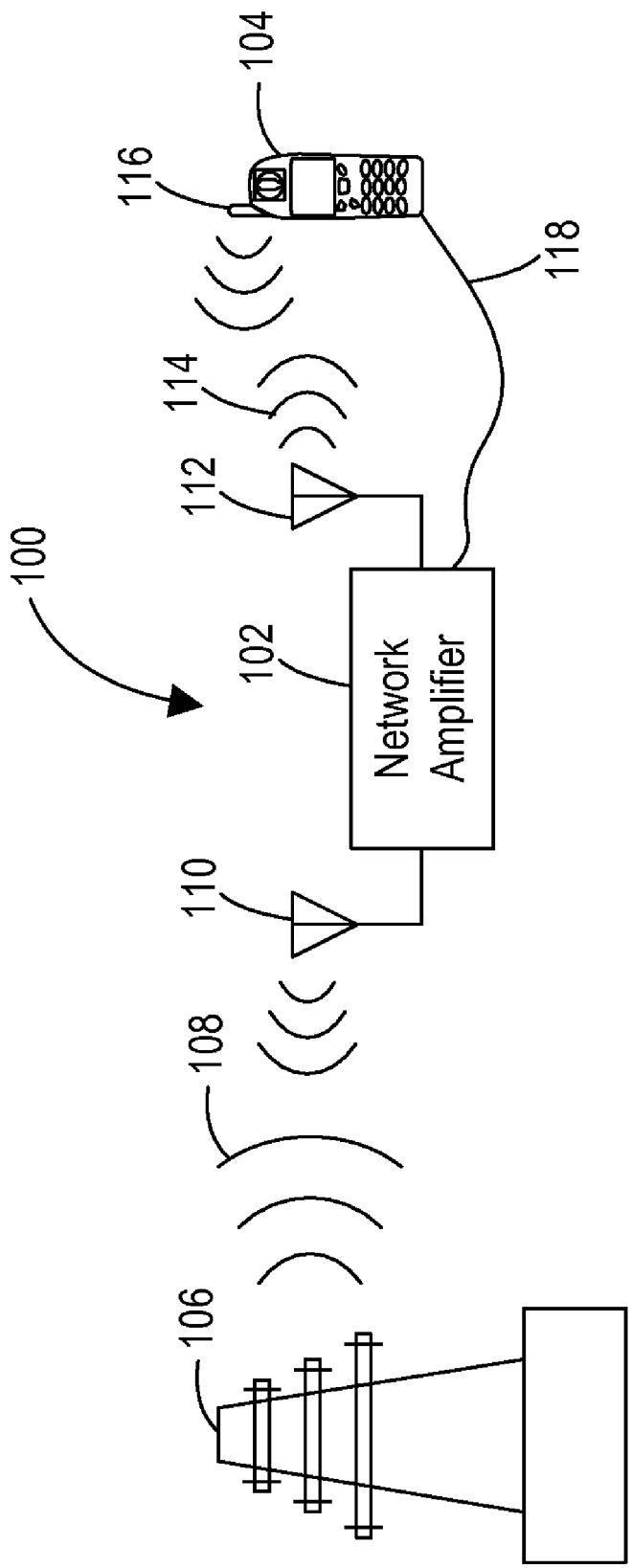
FIG. 1 illustrates a block diagram of a cellular communications system.

In the following detailed description of the preferred embodiments, reference is made to the accompanying drawings which form a part hereof, and in which are shown by way of illustration specific embodiments of the invention. It is to be understood that other embodiments may be utilized and structural changes may be made without departing from the scope of the present invention.

Embodiments of the invention relate to an amplification circuit that enables a network amplifier to amplify multiple mobile telephone signals transmitted at different frequencies. The amplification circuit includes a first diplexer which receives a first signal having a first frequency band and a second signal having a second frequency band. The first diplexer generates a combined signal containing both the first and the second signals. The combined signal is amplified by a single low noise amplifier to generate an amplified combined signal.

A second diplexer receives the amplified combined signal and separates the amplified combined signal into a first amplified signal having the first frequency band and a second amplified signal having the second frequency band. The resultant signals can then be transmitted by the network amplifier to a target destination, such as a handset or base station. The present invention eliminates the need for a network amplifier to use multiple amplifiers for each frequency band being amplified, thereby saving cost and improving signal to noise ratio.

For purposes of the present invention, the following definitions are provided. The terms "cellular" and "cellular network" refer to a wireless telephone network that connects radio transmissions between a mobile phone and a system of multiple cell sites, each including an antenna and a base station, to a mobile telephone switching office, and ultimately to the public wireline telephone system. Cellular calls are transferred from base station to base station as a user travels from cell to cell. One of skill in the art can appreciate that embodiments of the invention can be applied to other wireless networks as well.

By way of example, the phrase "cell phone" refers to a wireless device that sends and receives messages using radiofrequency signals in the 800-900 megahertz (MHz) portion of the radiofrequency (RF) spectrum, and the phrase "PCS phone" (personal communication system phone) refers to a wireless device that uses radiofrequency signals in the 1850-1990 MHz portion of the RF spectrum. For purposes of simplicity, as used herein, the terms "cell phone" and "handset" are intended to cover both "cell phone" and "PCS phone", as defined above, as well as other handheld devices. Likewise, as used herein, the phrase "cellular signal" refers to signals being transmitted both in the cell phone spectrum (i.e., 800-900 MHz) and in the PCS spectrum (i.e., 1850-1990 MHz). One of skill in the art can appreciate that embodiments of the invention are not limited to operation in these spectrums, but can be applied in other portions of the frequency spectrum as well.

"Cell site" and "base station" are used herein interchangeably. Cell site and base station are defined as the location where the wireless antenna and network communications equipment is placed. A cell site or base station typically includes a transmitter/receiver, antenna tower, antennas and radio controllers for maintaining communications with mobile handsets within a given range.

The word "uplink" refers to the transmission path of a signal being transmitted from a handset to a base station. The word "downlink" refers to the transmission path of a signal being transmitted from the base station to the handset. The phrases "uplink signal" and "downlink signal" are not limited to any particular type of data that may be transmitted between a handset and a base station, but instead are simply used to specify the direction in which a signal is being transmitted.

Referring now to FIG. 1, one embodiment of a communications system 100 is illustrated in which the present invention may operate. The communications system 100 may be a cellular telephone wireless network or other wireless network. In this example, a network amplifier 102 amplifies the signals (uplink and/or downlink signals) transmitted between a base station 106 and a handset 104. In a typical system, the network amplifier 102 is located in close proximity to the handset 104 in comparison to the distance to the base station 106. The base station 106 transmits a signal 108, which is attenuated for various reasons known to one of skill in the art as it travels outward from the base station 106. An antenna 110 receives the signal 108 and converts the signal into an electrical equivalent.

The network amplifier 102 amplifies the electrical signal and communicates the amplified signal to the handset 104. For example, the amplifier 102 may retransmit the electrical signal from a second antenna 112 as an amplified RF signal 114, which is received by an antenna 116 of the handset 104. Alternatively, the amplifier 102 may communicate the electrical signal to the handset 104 via a wired connection 118. The handset 104 ultimately processes the signal and communicates the appropriate content to a user of handset 104.

Similarly, the handset 104 may communicate content to the network amplifier 102 by transmitting a signal from the antenna 116 or the wired connection 118. The network amplifier 102 amplifies the received signal and retransmits the signal using the antenna 110. The transmitted signal is received by the base station 106, which may perform a number of operations on the signal, as determined by the wireless service provider.

Occasionally, the network amplifier 102 may be in communication with multiple handsets 104, via a wired and/or a wireless link. In some circumstances, the different handsets 104 may transmit wireless and signals having different frequencies from one another. As discussed previously, some handsets may transmit/receive using a first frequency or a first frequency band. Other handsets may transmit/receive using a second frequency or a second frequency band. However, many network amplifiers 102 are only configured to amplify a single frequency band.

Figure 2:
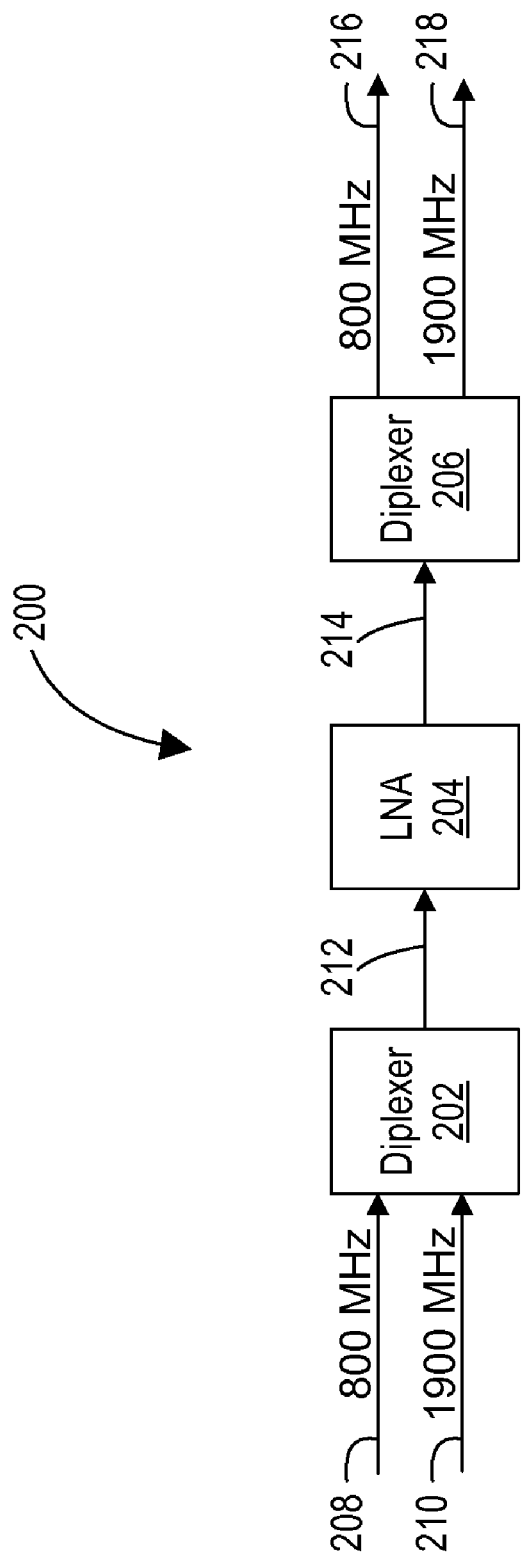
FIG. 2 illustrates a schematic of one embodiment of an amplification circuit for amplifying two mobile telephone signals transmitted at different frequencies.

The present invention provides a solution for amplifying multiple mobile telephone signals being transmitted at different frequencies. Referring now to FIG. 2, a schematic block diagram is provided of an amplification circuit 200 capable of amplifying signals of two different frequencies or frequency bands within a cellular network amplifier. The amplification circuit 200 includes a first diplexer 202, a low noise amplifier 204, and a second diplexer 206. The amplification circuit 200 may be employed for amplifying either uplink signals or downlink signals. The first diplexer 202 is capable of receiving at least two different signals 208 and 210, where each signal has a different frequency band. For example, as illustrated in FIG. 2 the diplexer 202 may receive a cellular signal 208 at approximately 800 MHz, and the PCS signal 210 at approximately 1900 MHz. The diplexer 202 combines the two signals 208 and 210 into a single signal 212. The signal 212 may include, for example, the summation of the received signals 208 and 210.

The low noise amplifier 204 amplifies the combined signal 212 to generate an amplified combined signal 214. Because the diplexer 202 was used to combine the signals 208 and 210, a single low noise amplifier 204 may be employed instead of using separate amplifiers for amplifying the two signals 208 and 210.

The second diplexer 206 separates the amplified combined signal 214 into two signals 216 and 218, which include the two different frequencies that were originally received. The two signals can then be communicated either by a wired connection or an antenna to a target destination. For example, if the amplifier circuit 200 is employed for amplifying downlink signals, the signals 216 and 218 may be communicated to one or more handsets. Alternatively, if the amplifier circuit 200 is employed for amplifying uplink signals, the signals 216 and 218 may be communicated via an antenna to a base station.

In one embodiment, the low noise amplifier 204 includes a Field Effect Transistor (FET). The FET can be specifically designed to operate an the frequencies of both the first and second signals 208 and 210 received by the diplexer 202. By using a single discrete low noise amplifier 204, noise ratios as low as two-tenths dB may be obtained in one embodiment. Conversely, if a first MMIC is used for amplifying the first signal 208 and a second MMIC is used for amplifying the second signal 210, as is commonly performed in conventional network amplifiers, noise figures of 4 dB commonly result. In the event that an MMIC was created capable of amplifying signals having different frequencies, the resultant MMIC would inherently possess higher noise ratios than can be obtained by using a single discrete low noise amplifier 204, as described herein.

Figure 3:
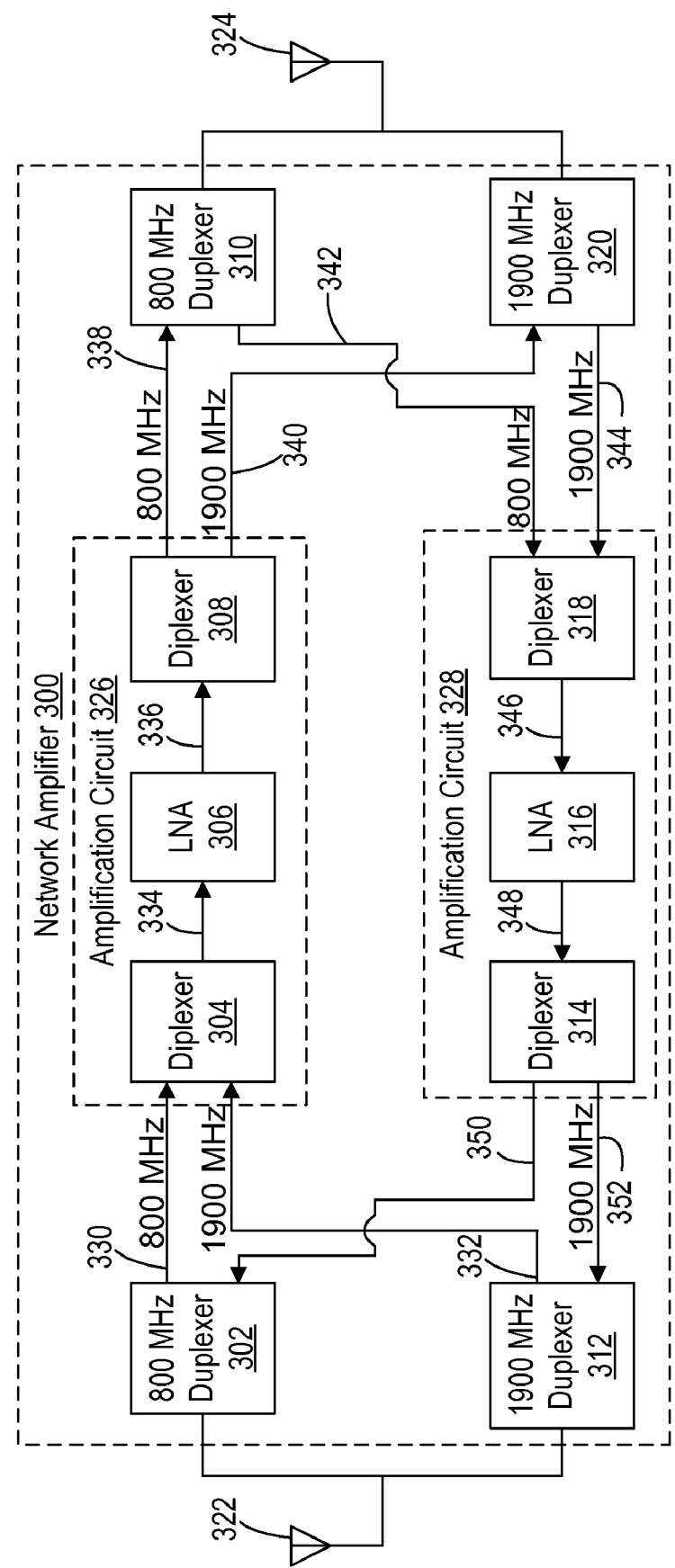
FIG. 3 illustrates a schematic of one embodiment of a bidirectional network amplifier for amplifying mobile telephone signals transmitted at different frequencies.

Referring now to FIG. 3, a detailed schematic block diagram is provided of a bidirectional network amplifier 300. The bidirectional network amplifier 300 includes a first amplification circuit 326 for amplifying an uplink signal and a second amplification circuit 328 for amplifying a downlink signal.

The antenna 322 receives and transmits mobile telephone signals to and from one or more handsets. The first duplexer 302 allows the antenna 322 to receive and transmit signals within a first frequency band and a second duplexer 312 enables the antenna 322 to receive and transmit signals within a second different frequency band. In the FIG. 3 example, the duplexer 302 passes signals within the cell phone spectrum (i.e., 800-900 MHz), and the duplexer 312 passes signals within the PCS spectrum (i.e., 1850-1990 MHz). As will be appreciated by one of ordinary skill in the art, the present embodiment may further include an additional diplexer (not shown) between the duplexers 302 and 312 and the antenna 322.

The uplink signals 330 and 332 received from handsets transmitting both the first and second frequency bands are passed to the amplification circuit 326 to be combined by the diplexer 304. The combined uplink signal 334 is amplified by a single low noise amplifier 306. The resultant amplified signal 336 is separated into two different signals 338 and 340 by the diplexer 308, where the first signal 338 contains the first frequency band and the second signal 340 contains the second frequency band.

The first signal 338 is received by a third duplexer 310 configured for allowing antenna 324 to receive and transmit signals within the first frequency band. The second signal 340 is received by a fourth duplexer 320 configured for allowing the antenna 324 to receive and transmit signals within the second frequency band.

Similarly, the antenna 324 receives and transmits mobile telephone signals to and from one or more base stations. The third duplexer 310 passes downlink signals transmitted within the first frequency band and the fourth duplexer 320 passes downlink signals transmitted within the second frequency band to the diplexer 318. As will be appreciated by one of ordinary skill in the art, the present embodiment may further include an additional diplexer (not shown) between the duplexers 310 and 320 and the antenna 324.

Diplexer 318 combines the downlink signals 342 and 344, and the combined downlink signal 346 is amplified by a single low noise amplifier 316. The resultant amplified signal 348 is separated into two different signals 350 and 352 by the diplexer 314, where the signal 350 contains the first frequency band and the signal 352 contains the second frequency band.

The signal 350 is received by the first duplexer 320, which is configured to pass signals within the first frequency band to the antenna 322 to be transmitted to a target handset. The second signal 352 is received by the second duplexer 312, which is configured to pass signals within the second frequency band to the antenna 322 to be transmitted to a target handset.

By using the amplification circuits 326 and 328, the networking amplifier 300 is able to amplify uplink and downlink signals having two different frequencies using only two amplifiers. By way of comparison, many conventional network amplifiers capable of amplifying uplink and downlink signals having two different frequencies use four separate amplifiers. Consequently, the network amplifier 300 benefits from significant cost savings over many conventional amplifiers. Furthermore, as described previously, the use of a low noise amplifier results in a lower noise level than conventional network amplifiers using separate MMIC amplifiers for each frequency band.

The bidirectional network amplifier 300 illustrated in FIG. 3 is merely one example configuration using the amplification circuits described herein. In an alternative embodiment, an amplification circuit 200 is only used to amplify the uplink signal path. The downlink signal path may be left unamplified, or alternatively, may be amplified using conventional techniques (e.g., using a separate amplifier for each frequency band). Similarly, the amplification circuit 200 can be used to amplify the downlink signal path and not the uplink signal path.

As described previously, the present invention describes an amplification circuit for use in a network amplifier that is capable of amplifying mobile telephone signals transmitted at any two or more different frequencies using a single amplifier. Although examples have been provided that include the cellular and PCS frequency spectrums, the present invention may also be applied to other frequency spectrums such as, for example, the NMT-450 standard (i.e., 450 MHz), the GSM standard (i.e., 850 MHz, 900 MHz, 1800 MHz and 1900 MHz), as well as other frequency bands.

The present invention may be embodied in other specific forms without departing from its spirit or essential characteristics. For example, the present invention is not limited to mobile telephones but can be applied to other situations where signals having multiple frequencies are amplified. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a network amplifier, a power amplification circuit for amplifying two signals having different frequencies using a single amplifier, comprising:
    a first diplexer configured to receive a first signal having a first frequency band and a second signal having a second frequency band and generate a combined signal containing both the first and the second signals;
    a single low noise amplifier coupled to the first diplexer and configured to amplify the combined signal and to generate an amplified combined signal; and
    a second diplexer coupled to the low noise amplifier and configured to separate the amplified combined signal into a first amplified signal having the first frequency band and a second amplified signal having the second frequency band.

2. The power amplification circuit as recited in claim 1, wherein the low noise amplifier comprises a Field Effect Transistor (FET).

3. The power amplification circuit as recited in claim 2, wherein the FET is tuned to function at both the first and the second frequencies.

4. The power amplification circuit as recited in claim 1, wherein the first frequency band includes the cellular phone spectrum and the second frequency band includes the PCS spectrum.

5. The power amplification circuit as recited in claim 1, wherein the first and second signals are uplink signals received from one or more handsets.

6. The power amplification circuit as recited in claim 1, wherein the first and second signals are downlink signals received from a base station.

7. A network amplifier comprising:
    a first antenna that receives signals containing at least a first frequency band and a second frequency band;
    a first diplexer configured to receive the signals from the first antenna and to generate a combined signal containing each signal received by the first antenna;
    a first amplifier coupled to the first diplexer and configured to amplify the combined signal and to generate an amplified combined signal;
    a second diplexer coupled to the first amplifier and configured to separate the amplified combined signal into a first amplified signal having the first frequency band and a second amplified signal having the second frequency band; and
    a second antenna configured to transmit the first and second amplified signals to target handsets.

8. The network amplifier as recited in claim 7, wherein the first and second signals are downlink signals, and wherein the second antenna is further configured to receive uplink signals from at least two different sources, the uplink signals being transmitted at either the first frequency band or the second frequency band, the network amplifier further comprising:
    a third diplexer configured to receive the uplink signals from the second antenna and to generate a combined uplink signal containing each uplink signal received by the second antenna;
    a second amplifier coupled to the first diplexer and configured to amplify the combined uplink signal and to generate an amplified combined uplink signal; and
    a fourth diplexer coupled to the first amplifier and configured to separate the amplified combined uplink signal into a first amplified uplink signal having the first frequency band and a second amplified uplink signal having the second frequency band;
    wherein the first antenna is further configured to transmit the first and second amplified uplink signals.

9. The network amplifier as recited in claim 8, further comprising:
    a first duplexer coupled to the first antenna and tuned to the first frequency band;
    a second duplexer coupled to the first antenna and tuned to the second frequency band;
    a third duplexer coupled to the second antenna and tuned to the first frequency band; and
    a fourth duplexer coupled to the second antenna and tuned to the second frequency band.

10. The network amplifier as recited in claim 7, wherein the amplifier includes a low noise Field Effect Transistor (FET).

11. The network amplifier as recited in claim 10, wherein the low noise FET is tuned to function at both the first and the second frequency bands.

12. The network amplifier as recited in claim 7, wherein the first frequency band includes the cellular phone spectrum and the second frequency band includes the PCS spectrum.

* * * * *